T. C. Moore,
Harvester Dropper.
No. 107,522.    Patented Sep. 20, 1870.
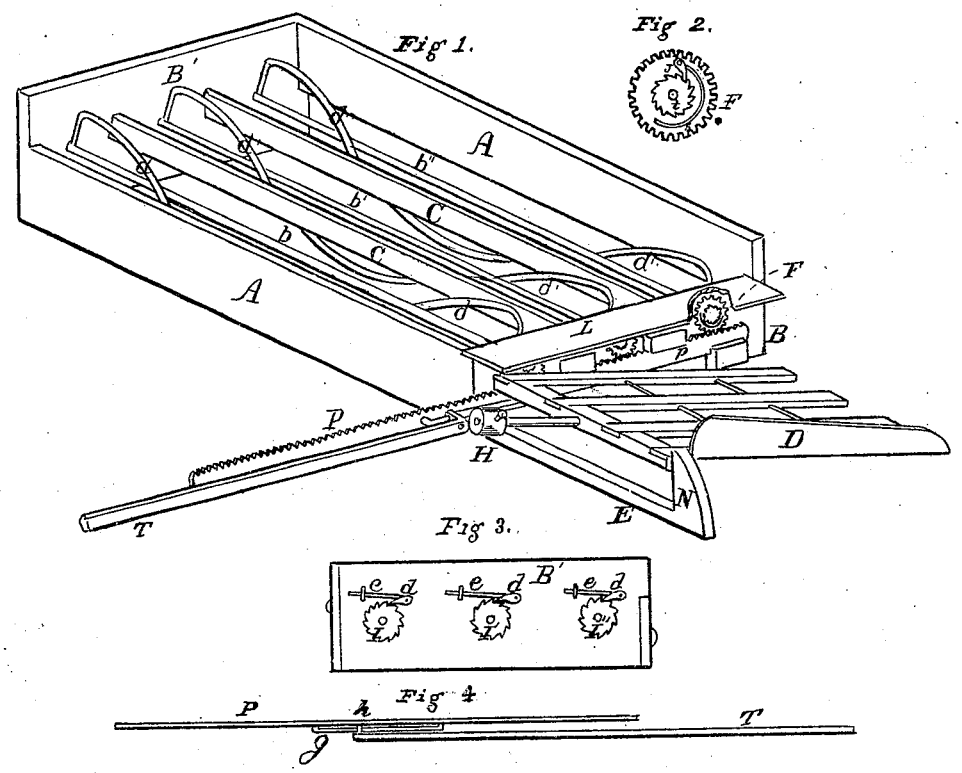

UNITED STATES PATENT OFFICE.

THOMAS C. MOORE, OF DUBLIN, INDIANA, ASSIGNOR TO HIMSELF AND JOSHUA G. WICKERSHAM, OF SAME PLACE.

IMPROVEMENT IN HARVESTER-DROPPERS.

Specification forming part of Letters Patent No. 107,522, dated September 20, 1870.

*To all whom it may concern:*

Be it known that I, THOMAS C. MOORE, of Dublin, in the county of Wayne and State of Indiana, have invented an Improved Dropper for Harvesters; and I do hereby declare the following to be a full description thereof, reference being had to the accompanying drawing, in which—

Figure 1 is a perspective view. Fig. 2 is an enlarged view of a pinion and ratchet. Fig. 3 is a view showing mechanism at one end of the platform. Fig. 4 shows part of the mechanism for operating the conveyer.

The same letters in the different figures refer to corresponding parts.

My invention relates to the part of or attachment to a harvester that receives the grain as it falls from the cutter and deposits it in gavels at the rear of the machine.

To enable others skilled in the art to make and use my invention, I will proceed to describe its construction and operation.

The frame or body of the main platform is composed of the sides A and A′, ends B and B′, and braces C and C′. A is the front of the platform, to which the sickle-bar is attached, the platform being connected with the machine in the usual manner of attaching that part to a harvester. $a\ a'\ a''$ are spiral conveyers, which, in the accompanying example, are formed of rods, respectively coiled spirally around the shafts $b\ b'\ b''$, the ends of each of which are bent to a right angle with the axis of the spiral, and inserted and riveted in holes in its respective shaft, near the ends of the latter, by which means they are secured.

The shafts $b\ b'\ b''$ have journal-bearings in the end pieces B and B′. On the ends of said shafts, or the journals thereof, extending through the end B, are pinions F F′ F″, one of which is shown in Fig. 2. These pinions are loose on their respective journals, and are provided with ratchets $t$ and pawls J and a spring, S, for the purpose of holding said pawl against the ratchet-teeth. The ratchets $t$ are rigidly fastened on the ends of the shafts or journals outside of their respective pinions, and the pawls are attached to the pinions. By this arrangement of the parts the pinions F F′ F″, only when turned in one direction, impart motion to their respective journals.

P is a rack, provided with suitable bearings beneath pinions F F′ F″, which engages with and is designed to operate said pinions. T is a connecting-rod, attached to rack P and to the driving-wheel of the machine. L is an apron, covering end B and the mechanism in proximity thereto. D is a pivoted dropper, balanced by an adjustable weight, H, its position, when not tilted, being parallel to and about even in height with apron L. The said dropper D is pivoted to an upright piece, N, at the end of beam E and to the end B of the platform.

The conveyers $a\ a'\ a''$ are designed to occupy such relation to each other that the position of the coil of each will correspond with the others, as shown in the drawing.

The operation of the machine is as follows: The grain falls from the cutter across the conveyers $a\ a'\ a''$. At each alternate stroke of the rack P, which latter is actuated by the revolutions of the driving-wheel, the said conveyers are simultaneously rotated in a direction suited to their coil, by which the grain, owing to the conveying action thus produced, is discharged upon the dropper D. By reason of the arrangement of the before-mentioned ratchets and pawls with the pinions F F′ F″, the return-stroke of the rack P turns said pinions loosely on their journals without effecting the positions of the conveyers.

To prevent friction from causing the conveyers to rotate backward at the return-stroke of rack P, ratchets and pawls are placed on the outside of the end B′, as shown in Fig. 3, said ratchets being rigidly attached to the ends of the shafts or journals $b\ b'\ b''$, and the pawls to said end B′. Springs $e$ serve to hold said pawls against the ratchet-teeth.

When the desired quantity of grain for a sheaf, which is regulated by means of the adjustable weight H, accumulates upon dropper D, the latter is tilted, and deposits the grain ready for binding.

In order that a stroke of the rack and the consequent discharge of the grain from the conveyers may not require the time of half a revolution of the driving-wheel, the connecting-rod T is so connected with rack P that it has a play, by reason of which the strokes of the rack are made during times in the revolution of the driving-wheel when the wrist-pin is passing points nearest and farthest from said rack, and as much each side thereof, less than a half-revolution, as may be necessary or desirable.

The manner of connecting the rack and rod T, in the accompanying example, is by means of a rod, $g$, at the side of said rack, with its ends bent and riveted in holes in the latter, and a right-angle projection at the end of rod T, having an eye, which slides on said rod $g$, as shown separately in Fig. 4.

Having thus fully described my said invention, what I claim, and desire to secure by Letters Patent, is—

1. The combination of the spiral or screw conveyers with a rack and pinions, so that said conveyers will be rotated simultaneously and have intervals of rest, substantially as described, and for the purpose set forth.

2. In combination with the spiral conveyers, the dropper D, formed of slats, as shown, so that the stubble may aid in delivering the grain from it, and provided with an adjustable balancing-weight, H, as specified, and for the purpose set forth.

THOMAS C. MOORE.

Witnesses:
    JOHN C. WHITRIDGE,
    JOSEPH RIDGE.